(12) United States Patent
Short et al.

(10) Patent No.: US 7,721,260 B2
(45) Date of Patent: May 18, 2010

(54) EMBEDDED TEST I/O ENGINE

(75) Inventors: Keith Edward Short, Lafayette, CO (US); Joseph G. Skazinski, Berthoud, CO (US)

(73) Assignee: Kozio, Inc., Longmont, CO (US)

( * ) Notice: Subject to any disclaimer, the term of this patent is extended or adjusted under 35 U.S.C. 154(b) by 943 days.

(21) Appl. No.: 10/711,287

(22) Filed: Sep. 8, 2004

(65) Prior Publication Data

US 2006/0069960 A1   Mar. 30, 2006

(51) Int. Cl.
*G06F 9/44* (2006.01)

(52) U.S. Cl. .................. 717/124; 717/125; 717/126; 717/127; 717/128

(58) Field of Classification Search ............... 717/101, 717/124; 714/29, 43, 724; 703/27
See application file for complete search history.

(56) References Cited

U.S. PATENT DOCUMENTS

| | | | | |
|---|---|---|---|---|
| 4,829,520 A | * | 5/1989 | Toth ...................... | 714/724 |
| 5,072,371 A | * | 12/1991 | Benner et al. ............... | 712/11 |
| 6,047,391 A | * | 4/2000 | Younis et al. ............... | 714/47 |
| 6,314,530 B1 | * | 11/2001 | Mann ...................... | 714/38 |
| 6,904,544 B2 | * | 6/2005 | DeRolf et al. ............... | 714/43 |
| 7,010,782 B2 | * | 3/2006 | Narayan et al. ............. | 717/124 |
| 7,058,855 B2 | * | 6/2006 | Rohfleisch et al. .......... | 714/28 |
| 7,100,150 B2 | * | 8/2006 | Polk ....................... | 717/124 |
| 2002/0055834 A1 | * | 5/2002 | Andrade et al. ............ | 703/27 |
| 2002/0144175 A1 | * | 10/2002 | Long et al. ................ | 714/11 |
| 2003/0097650 A1 | * | 5/2003 | Bahrs et al. ............... | 717/124 |
| 2004/0199897 A1 | * | 10/2004 | Ghercioiu et al. .......... | 717/101 |
| 2005/0102572 A1 | * | 5/2005 | Oberlaender .............. | 714/29 |

\* cited by examiner

*Primary Examiner*—Insun Kang
(74) *Attorney, Agent, or Firm*—Russell S. Krajec; Krajec Patent Offices, LLC

(57) ABSTRACT

A system and method for testing input and output paths connected to an embedded processor. Specialized test software operating on the embedded processor creates one or more test workers or threads, each having a specific routine to perform, which are executed in parallel, stressing various communication paths. The results may be analyzed to help in many different ways during the life cycle of the device with the embedded controller.

19 Claims, 5 Drawing Sheets

EMBEDDED TEST I/O ENGINE

TECHNICAL FIELD

The present invention pertains generally to embedded controllers and specifically to test software used to debug embedded controller hardware.

DESCRIPTION OF THE BACKGROUND

Embedded controllers are ubiquitous, contained in many devices from complex disk controllers to small appliances. Often, the embedded controller runs a set of computer programs that perform many complex functions. Both the hardware and software can be complex and require many man hours to create.

When a new product is being developed, both the hardware and software must be tested and evaluated. In cases where the hardware and software are both complex and the software is required for the hardware to operate, the 'turn on' time for the device may be difficult because problems may not be quickly isolated to either hardware or software.

Many devices with embedded controllers have input and output functions. For example, a disk drive controller device may take input from one bus and send the information to the various disk drives it controls. The algorithm used by the embedded controller to process the input and output of the device may be very complex. When turning on a new hardware design with untested software, the debugging process may be long, tedious, and costly.

It would therefore be advantageous to provide a system and method whereby a device with an embedded controller may quickly and reliably test its own hardware circuitry, especially the input and output channels. It would be further advantageous if such a system and method were repeatable, accurate, and was able to characterize the performance of certain areas of the hardware.

SUMMARY OF THE INVENTION

The present invention overcomes the disadvantages and limitations of previous solutions by providing a system and method for testing input and output paths connected to an embedded processor. Specialized test software operating on the embedded processor creates one or more test workers or threads, each having a specific routine to perform. The workers may be executed in parallel, stressing various communication paths. The results may be analyzed to help in many different ways during the life cycle of the device with the embedded controller.

An embodiment of the present invention may include a software diagnostics platform comprising: a command interface adapted to receiving commands and outputting results; an engine adapted to running a test sequence; an output driver adapted to timestamping an outgoing message and storing the outgoing message; an input driver adapted to timestamping an incoming message and storing the incoming message; and an analysis routine adapted to analyzing the outgoing message and the incoming message; the software system being operable on an embedded processor.

Another embodiment of the present invention may include a system comprising: a device with an embedded processor, the device having a specific function; a first software system operable to run on the embedded processor and enable the device to perform the specific function; and a second software system operable to run on the embedded processor, the second software system comprising: a command interface adapted to receiving commands and outputting results; an engine adapted to running a test sequence; an output driver adapted to timestamping an outgoing message and storing the outgoing message; an input driver adapted to timestamping an incoming message and storing the incoming message; and an analysis routine adapted to analyzing the outgoing message and the incoming message.

Yet another embodiment of the present invention may include a test system comprising: a reusable test sequence; a first command interpreter adapted to interpret the reusable test sequence, the first command interpreter being adapted to operate on a first embedded processor; and a second command interpreter adapted to interpret the reusable test sequence, the second command interpreter being adapted to operate on a second embedded processor; wherein the first command interpreter and the second command interpreter each comprise: a command interface adapted to receiving commands and outputting results; an engine adapted to running a test sequence; an output driver adapted to timestamping an outgoing message and storing the outgoing message; an input driver adapted to timestamping an incoming message and storing the incoming message; and an analysis routine adapted to analyzing the outgoing message and the incoming message.

Still another embodiment of the present invention may include a method of developing a circuit having an embedded processor comprising: designing a circuit having the embedded processor, the circuit having a predefined function; assembling the circuit; designing software operable on the embedded processor, the software adapted to enable the circuit to perform the predefined function; loading the embedded processor with a test platform software comprising: a command interface adapted to receiving commands and outputting results; an engine adapted to running a test sequence; an output driver adapted to timestamping an outgoing message and storing the outgoing message; an input driver adapted to timestamping an incoming message and storing the incoming message; an analysis routine adapted to analyzing the outgoing message and the incoming message and create results; and a display routine for displaying the results; creating the test sequence; transmitting the test sequence to the embedded processor loaded with the test platform software; operating the test sequence on the embedded processor; and analyzing the results.

The advantages of the present invention are that problems in the hardware design may be isolated and corrected before integrating the application software. Further, the hardware design may be characterized and qualified to a standard before software integration.

DETAILED DESCRIPTION OF THE INVENTION

Figure 1:
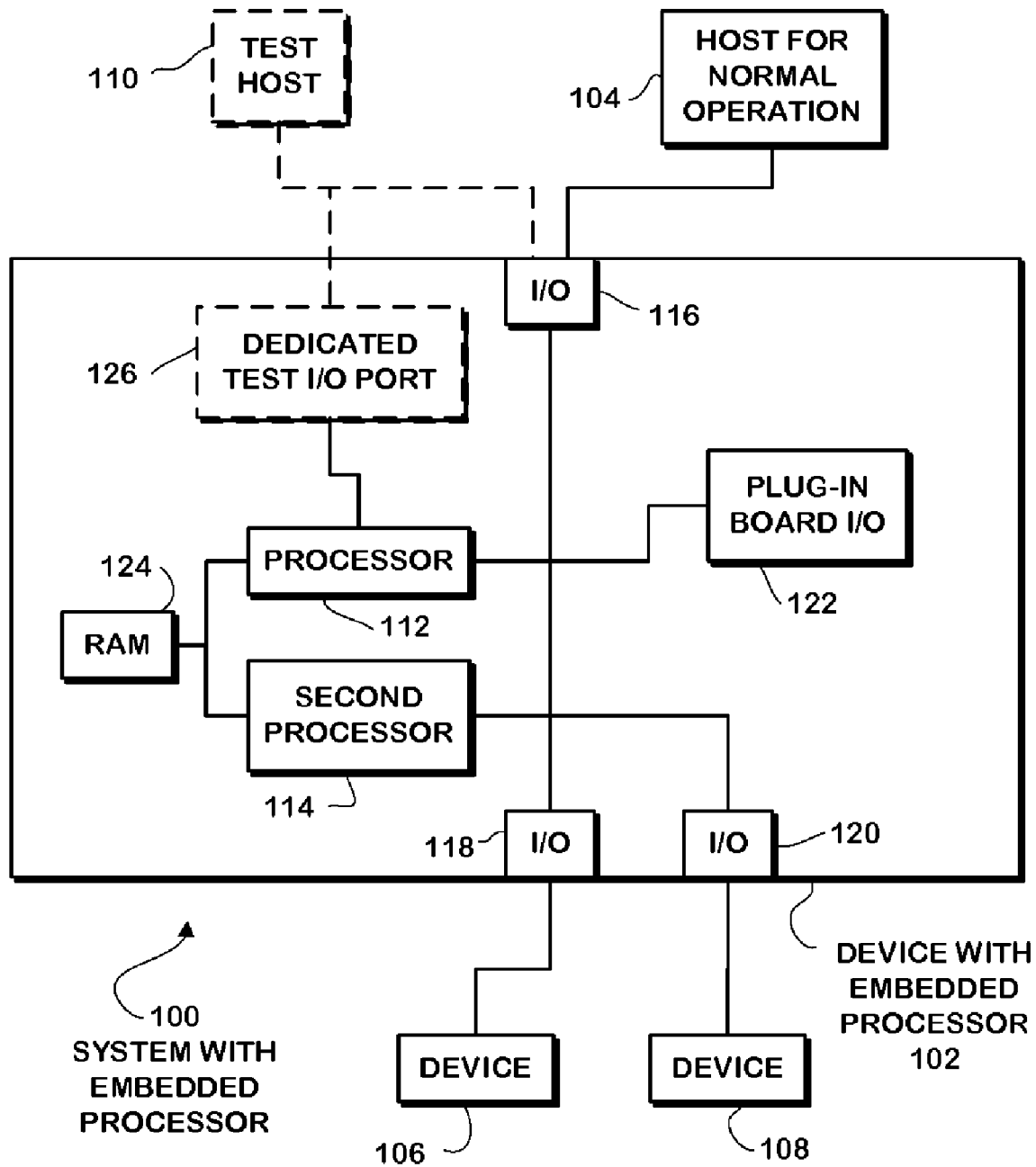
FIG. 1 is a diagrammatic illustration of an embodiment of the present invention showing a system with an embedded device.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify the elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there is no intervening elements present.

The present invention may be embodied as devices, systems, methods, and/or computer program products. Accordingly, the present invention may be embodied in hardware and/or in software (including firmware, resident software, micro-code, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), an erasable programmable read-only memory (EPROM or Flash memory), an optical fiber, a portable compact disc read only memory (CD-ROM), and a digital video disk read only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

FIG. 1 illustrates an embodiment 100 of the present invention showing a system with an embedded processor. The device with an embedded processor 102 is shown connected to a host 104, devices 106 and 108, and a test host 110. The device 102 may have one or more microprocessors 112 and 114 that are connected to several I/O ports 116, 118, and 120. Additionally, microprocessors 112 and 114 may be connected to the I/O for a plug-in board 122. Each microprocessor 112 and 114 may be connected to random access memory (RAM) 124. One or more of the microprocessors 112 and 114 may be connected to a dedicated test I/O port 126.

Embodiment 100 may be a single board computer or a device with an embedded processor. Examples of such devices may be computer peripherals such as disk controllers, network interface cards, video controllers, and the like. Other examples may include large and small appliances such as dishwashers, washers, dryers, toasters, blenders, irons, coffee makers, or any electrical device having an embedded processor.

In some embodiments, the device 102 may be a 'system on a chip,' wherein several functional devices, such as a processor, RAM, and I/O devices may be manufactured in one chip package. Such devices are used in many systems where programmable logic is wanted. In such embodiments, the programmable memory may be a field programmable gate array (FPGA) or other similar technology.

In still other embodiments, the device 102 may have multiple printed circuit boards and various interconnected devices. Those skilled in the arts will appreciate that various embodiments of hardware circuitry may be evaluated and tested using the methods described herein without limiting the invention to the precise embodiments shown.

The embodiment 100 may have a single microprocessor 112 or may contain one or more additional microprocessors 114. In many embodiments, one microprocessor is sufficient for the device 102 to perform its intended function. In other embodiments, two or more microprocessors may be present. In some of those embodiments, the processors may operate in parallel and have parallel communication paths to I/O devices, while in other embodiments, one processor may have certain connections and functionality that another processor in the same system does not have.

The device 102 is connected to a host 104 and devices 106 and 108. Such an embodiment may be useful in a disk controller embodiment where the host 104 may be a computer and devices 106 and 108 may be disk drives. The host 104 may send commands to the device 102, which processes the commands and communicates with devices 106 and 108. In each communication between the host 104 and device 102 and between the device 102 and devices 106 and 108, the communication protocol may be simple or complex.

When the device 102 is prototyped and is first turned on, often a design engineer must painstakingly debug the circuitry. When the communications protocols used in the various I/O devices 116, 118, 120, or 122 are complex, it becomes increasingly difficult for the design engineer to get the system running at optimal performance.

One of the largest problems in debugging complex electronics with embedded processors is to determine which problems are associated with hardware and which with software. For example, in debugging a system with new hardware and new software, a performance issue may be the fault of complexities in the software or various design problems in the hardware. Because neither the software or hardware are known quantities, the process of debugging can be long and tedious.

A test host device 110 may be connected to one or more of the processors 112 and 114 to load and run specialized test software that can be used to exercise the device 102. Additionally, performance measurements of various functions may be taken. The software used for the specialized test does not necessarily have to be part of the application software that eventually runs on the processors 112 and 114 to give the device 102 its intended function.

The test host device 110 may connect through a dedicated test I/O port 126 or may use a normal channel 116 that would be used by another device during the normal functioning of the device 102. In some embodiments, the test host device 110 may be a command line terminal interface, while in other embodiments, a graphical user interface may operate on the test host 110 to send commands to the device 102. In some embodiments, the communication path between the host 110 and the device 102 may be wireless, such as radio, infrared, or other communications path.

The various I/O devices 116, 118, 120, and 122 may be any type of communications interface, including serial, parallel, wireless, or other, and may use any type of communication protocol, such as RS-232, RS-442, Centronics parallel, HP-IB, SCSI, IDE, Ethernet, Firewire, FibreChannel, PCI, 802.11 wireless, or any other communication scheme. Additionally, the I/O interfaces may be proprietary communications protocols or wireless communications interfaces.

Figure 2:
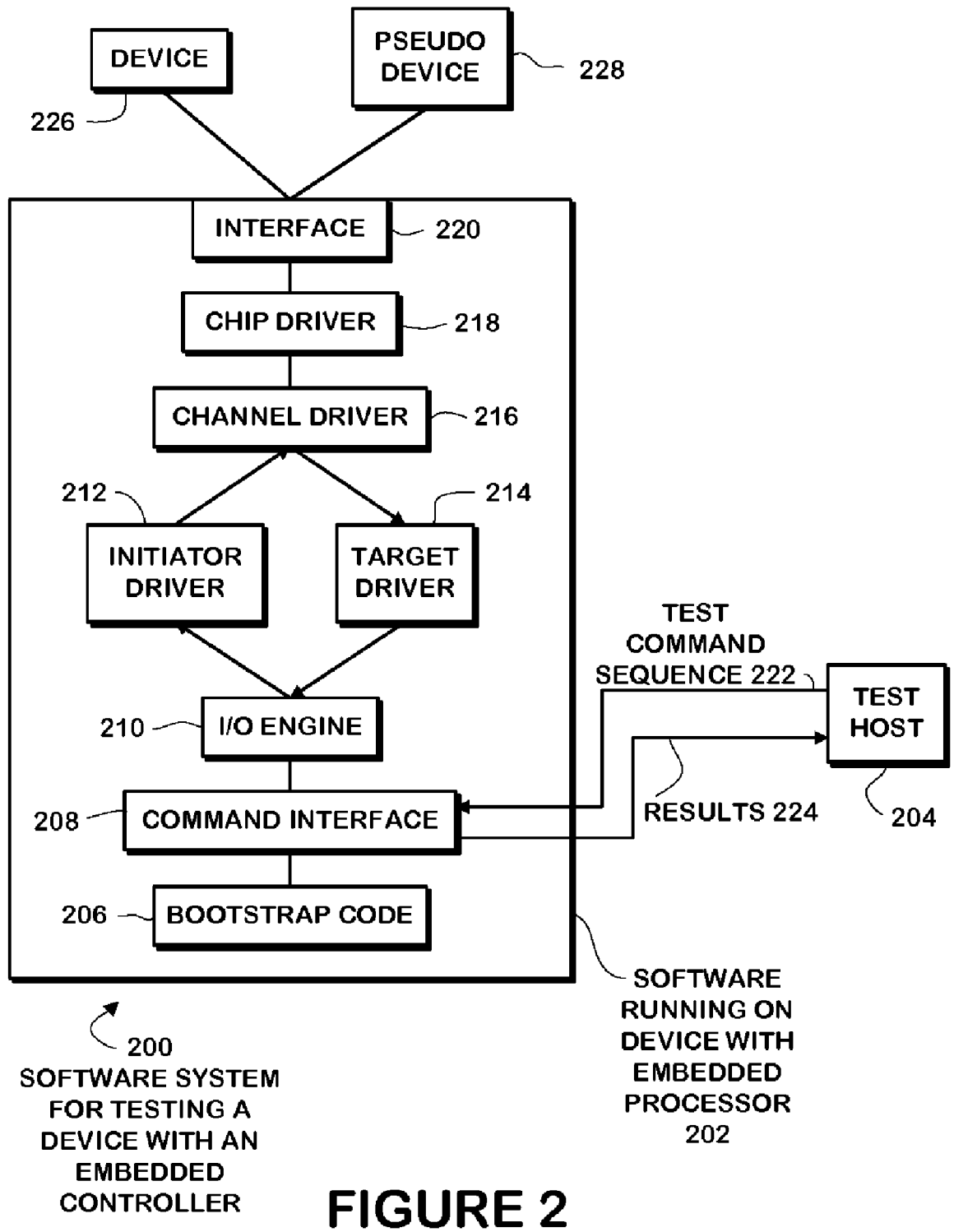
FIG. 2 is a diagrammatic illustration of an embodiment of the present invention showing a software system for testing a device with an embedded processor.

FIG. 2 is a diagram of various software components of an embodiment 200 of a software system used for testing a device with an embedded processor. The software running on the embedded controller 202 communicates with the test host 204. The software 202 comprises bootstrap code 206 and a command interface 208. The command interface 208 receives instructions 222 from the test host 204 and sends results 224. The command interface 208 communicates with an I/O engine 210 that send messages out through an initiator driver 212 and receives messages from a target driver 214. The messages may pass through a channel driver 216 and a chip driver 218 before communicating with the interface 220. The interface 220 may be connected to an actual device 226 or a pseudo device 228.

The command interface 208 may be the section of software wherein all communication with the host 204 is performed. Various commands 222 and responses 224 may be transmitted back and forth using any type of protocol or interface. A simple command line interface may be embodied using a standard serial port. In other embodiments, higher level and more complex protocols such as Ethernet may be used.

The I/O engine 210 may create the messages that are communicated through the path to the interface 220. Additionally, the I/O engine 210 may analyze the performance of the path by tagging the messages before sending them, then analyzing the messages when they are received. In some embodiments, many threads may be created by the I/O engine 210 to exercise the paths.

The initiator driver 212 prepares and sends messages over the path to the interface 220. For example, the initiator driver 212 may receive a sequence of bits to transmit, timestamp the message, and relay the message along the path. When an acknowledge for the command is received, another timestamp may be made.

The target driver 214 may receive messages from the path and process them. For example, the target driver 214 may receive a message and timestamp the message. In some instances, the target driver may also validate the message.

The channel driver 216 may perform standardized processing of a message to enable that message to be sent over the intended interface. For example if the interface was an Ethernet interface, the channel driver 216 may packetize the message, insert the appropriate header and footer. Additionally, the channel driver 216 may provide some error checking mechanism such as a cyclic redundancy check (CRC) or checksum.

The chip driver 218 and interface 220 may perform lower level functions required to drive the communication. For example, the interface 220 may be embodied in hardware and may perform some of the handshaking required to send a message over the interface. The chip driver 218 may be a software component that performs additional handshaking or other low level functions also required to transmit or receive a message.

Different interfaces 220 may have different chip drivers 218 and channel drivers 216, each having designs particular to the application.

The software 202 may perform communications to an actual physical device 226 that is capable of communicating using a particular protocol. For example, if the software 202 were testing a SCSI interface, a disk drive or other physical SCSI device may be used as the device 226. In some cases, the device 226 may be a loopback terminator or other hardware simulator.

In some embodiments, a pseudo device 228 may be used to perform some interface tests. The pseudo device 228 may be a state on the interface 220 that can be set by software to loopback some particular information. In one embodiment of a pseudo device 228, an interface may be configured to send all messages back through the communication path to the processor. The processor may be configured to return a message back to the interface which sends the message back to the software 202.

The pseudo device 228 may be a software tool to simulate the presence of a device 226 without necessarily having the device present. This may be useful when initially debugging the hardware communication path where the basic functionality is being tested. In another use, the pseudo device 218 may be useful when testing the device with the embedded processor in an environmental chamber such as a thermal chamber or emissions chamber where the presence of device 226 would be cumbersome or interfere with the test measurements.

The pseudo device 218 may allow for testing the maximum data throughout along the circuitry of the device with the embedded processor, without any detrimental effects of a separate device 226. For example, if the device 226 was slow processing a particular request, it would be difficult to determine if the length of time for processing the request was due to the device 226 or the device with the embedded processor running the software 202. By eliminating an unknown variable, the performance can be more accurately measured using the software 202.

In addition, the pseudo device 218 may provide a method of debugging the circuit before the fully functional interface is operating. For example, the pseudo device 228 may be used when initially sending signals across an interface 220. The software 202 may cause signals to be sent along the path to the interface 220 and allow a design engineer to check the signals along the circuit to make sure they are proper. After each signal line is verified, the proper sequencing and handshaking can be verified, all before actual communication with another physical device is attempted. By using the software 202 with or without the pseudo device 228, incremental steps toward debugging the hardware circuitry may be taken to verify the hardware integrity before attempting to run software developed for the circuitry.

The software 202 may perform several measurements, including testing data throughput, testing data validity, and testing conformity of the transmissions to various standards. Data throughput may be tested by timestamping an outgoing message and timestamping an acknowledge or return message. By sending many messages very quickly, the data transmission paths may be characterized by determining the amount of data that is able to be transmitted over a given time. In some instances, the data path may become saturated with messages, indicating an uppermost throughput.

The data may be tested for validity. Each data bit received may be compared to the data as transmitted. If a bit was changed, packets were dropped, or in some way the data were corrupted, such measurements may be analyzed to characterize the data validity performance of the system. In some embodiments, a parity error, checksum error, CRC error, or other error correcting mechanism may be used to measure the data integrity. In other embodiments, a bit by bit comparison may be made.

The data may be tested for conformity to a particular standard. Certain protocols may require standard data configuration, standard message configuration, and data handling at a particular speed. Each of these aspects of one or more message transfers may be analyzed and used to certify compliance to a particular standard.

Figure 3:
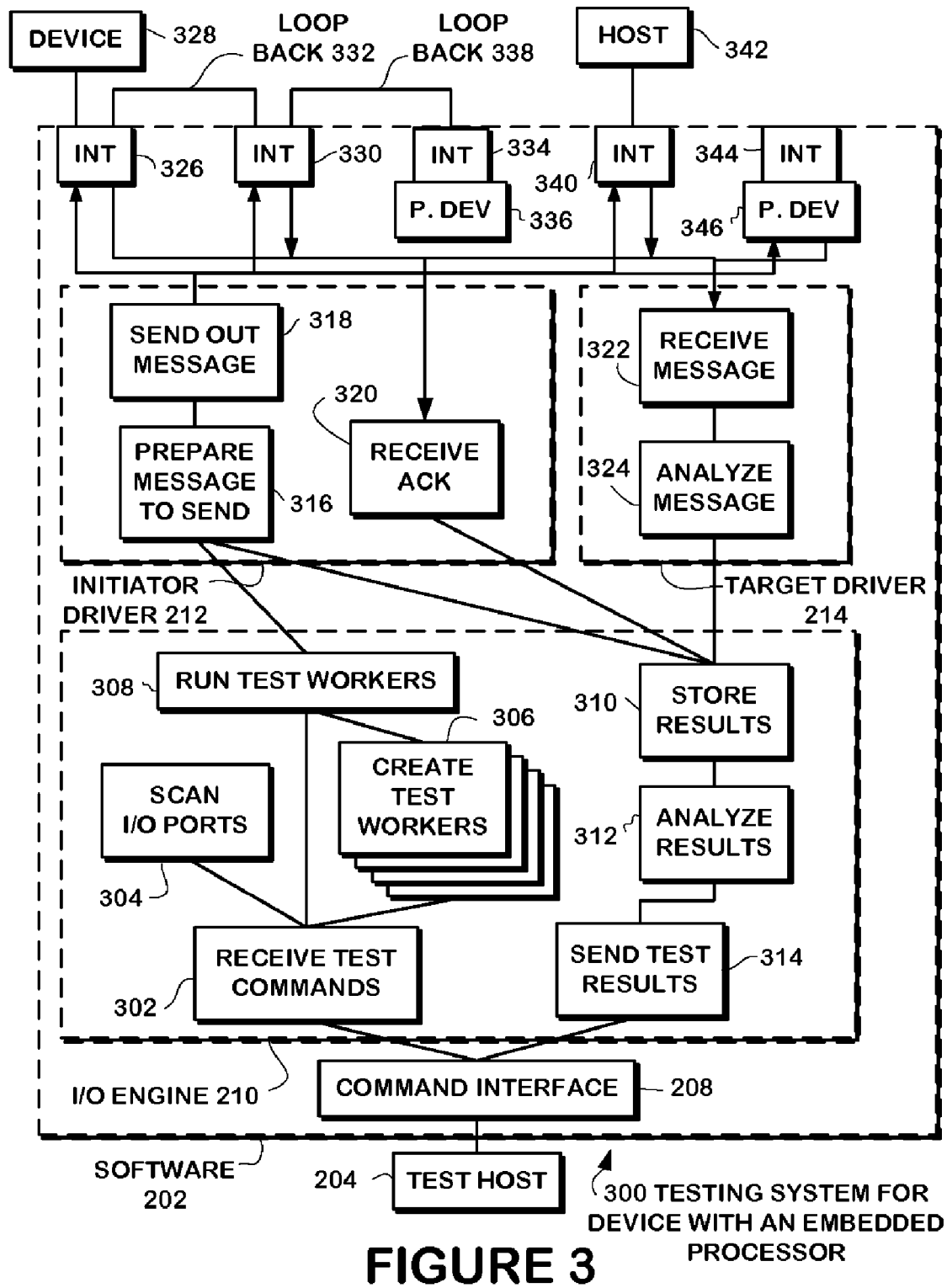
FIG. 3 is a diagrammatic illustration of a more detailed embodiment than shown in FIG. 2 of the present invention showing a software system for testing a device with an embedded processor.

FIG. 3 illustrates a more detailed embodiment 300 of some aspects of the software shown in FIG. 2. The test host 204 communicates with the command interface 208, which in turn communicates with the I/O engine 210. The I/O engine 210 communicates with the initiator driver 212 and the target driver 214.

The I/O engine 210 receives test commands 302, which are used to scan I/O ports 304, create test workers 306, and run test workers 308. Additionally, when information comes back from a test worker, the results are stored 310, analyzed 312, and reported 314 to the command interface 208.

The initiator driver 212 prepares messages to send 316 and transmits the messages 318. In some instances, the initiator driver 212 receives an acknowledgement 320.

The target driver 214 receives messages 322 and performs analysis 324 on those messages.

Several different embodiments of interfaces can be used. In some instances, the initiator driver 212 sends messages to an interface 326 which communicates to an actual device 328. Such an embodiment can be used to exercise the circuitry in a realistic manner by actually communicating with a fully functioning device. This may be used when the circuitry is known to be reasonably operable and can be used to give a good confidence that the circuitry functions as intended. Additionally, such an embodiment may be used for compliance testing to verify that the circuitry fully complies with an interface standard.

In another case, the initiator driver 212 sends a message to an interface 326, through a loop back 322, and to a second interface 330, where the message is treated like an incoming message and processed through the target driver 214. Such an embodiment may be used for preliminary testing and turn on of the circuitry as well as fully stress testing the circuit.

In another embodiment, the initiator driver 212 may send a message to a first interface 330, through a loop back 338 to a second interface 334 where a pseudo device 336 can reflect the message back through the loop back 338, the first interface 330, and finally to the target driver 214. The pseudo device 336 may perform simple processing of the messages, such as sending a standard response or reflecting the same message back unchanged. In other embodiments, the pseudo device 336 may perform some analysis of the messages, such as interpreting some portion of the message as a command and responding with an appropriate response. In other embodiments, the pseudo device 336 may decode an incoming message to determine data validity and respond with some result.

In yet another embodiment, a host 342 may send one message or a stream of messages through interface 340 and have the messages processed by the target driver 214. In such an embodiment, a single direction of message transfer may be performed. For example, the host may send many messages to the interface 340 as quickly as possible. In another example, many messages may be sent from the interface 340 to the host 342. In such an example, the host may analyze the messages for performance, data integrity, compliance with a standard, or other metrics.

In still another embodiment, the initiator driver 212 may send messages to a pseudo device 346 that is configured on an interface 344. The pseudo device 346 may return a message to be processed by the target driver 214. This embodiment may be useful in stress testing a circuit or for initial debugging of a circuit. The pseudo device 346 may be a configuration setting for the interface 344 where internal loop backs and/or other processing may be performed by the circuit residing at the interface 344. In some embodiments, the interface 344 may have some programmable settings, allowing various responses to be possible with the pseudo device 346.

The embodiment 300 is an example of the functionality of a software test system that can be operated on an embedded processor. Because the software can run on the embedded processor, the software may be low level software that does not require an operating system that may consume processor overhead. In some embodiments, the software may be directly bootable and written in a very low level language so that the processor may spend as much time as possible in exercising the circuitry rather than performing other functions.

The embodiment 300 allows the embedded processor to drive the interface circuitry rigorously and thoroughly. In this manner, the performance characteristics of the particular circuits can be exercised and characterized as close to their limits as possible. This information can be very valuable to a design engineer in debugging and characterizing the design, both when designing the hardware circuitry and the application software that will operate on the embedded processor.

The I/O engine 210 can perform an I/O port scan 304. Each I/O port can be queried to determine its status and any information available. For example, an I/O port scan may send an initial message to an I/O interface circuit, which may be a separate chip or circuit from the embedded processor. The I/O interface circuit may be able to initialize and return a message. The return message may contain an identifier for the interface, a status of the interface, current configuration, whether or not a device is attached, or other information. The scanned I/O ports may be then used for subsequent testing.

The test workers 306 may be instructions for sending messages across the circuitry to various interfaces. A test worker 306 may contain a destination port, a sequence of data to be sent, any special parameters that can be evaluated, or other information as required.

The test workers are run by the processor in block 308. Because the workers are previously created in block 306 and prepared for execution, when the processor runs the test workers in block 308, the messages may be prepared and sent as quickly as possible and thereby stress the circuitry as much as possible.

In some cases, the workers may contain certain sequences of data. For example, the data bits may be all '1' or all '0,' while in other examples, the data bits may be alternating '1' and '0.' Various patterns of data can be used to exercise the circuitry in different ways.

In some embodiments, the worker definition may contain a repeated command. For example, a worker may be created to send a packet of information to an interface, wait for a response, and send another packet after the response. The worker may be defined with a particular expected response or may accept any response. The worker definition may require a fixed number of executions, may operate as many executions as possible in a set period of time, or may run continuously until stopped.

When the test workers are being run, in some embodiments analyzing and reporting of results may be suspended. By suspending some functions such as analysis and reporting, the processor may be unburdened from other functions so that it can more fully exercise the interface circuitry. Such an embodiment may be useful for characterizing a circuit at its maximum performance.

In other embodiments, real time data analysis and reporting may occur, allowing a designer to see continuously updated results of ongoing operations. Such an embodiment may be useful when operating the circuitry under environmental tests or while debugging the circuitry.

When messages are being prepared to send in block 316, the messages may be timestamped prior to being sent. When the acknowledgement is received in block 320, the receipt may also be time stamped. The results of the two timestamps may be stored in block 310 and analyzed in block 312. By timestamping the outgoing and incoming messages, the amount of time for the message to travel can be computed. This information is useful in evaluating the amount of data that can be transmitted across an interface circuit. In some embodiments where the data throughput is not computed, timestamping may not be performed.

Figure 4:
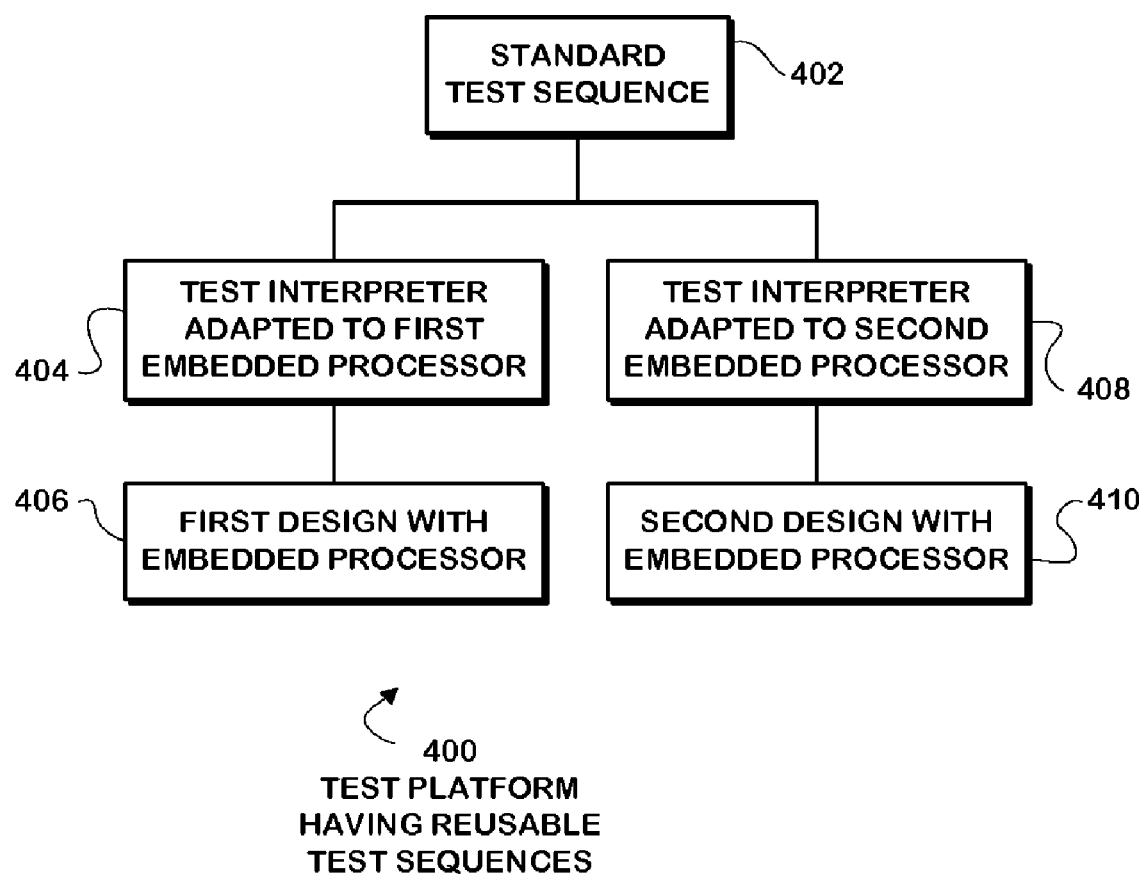
FIG. 4 is a diagrammatic illustration of an embodiment of the present invention showing a test platform having reusable test sequences.

FIG. 4 illustrates an embodiment 400 of the present invention showing a test platform having reusable test sequences. A standard test sequence 402 may be used with a first test interpreter 404 operable on the first design with an embedded processor 406. The same test sequence 402 may be used with a second test interpreter 408 operable on a second design with an embedded processor 410.

In many embodiments with embedded processors, the test interpreters 404 and 408 may be configured differently. For example, one processor may have a different command structure or data interface than a second processor. Nevertheless, the test interpreters 404 and 408 may have similar interfaces to the standard test sequence 402.

The test sequence 402 may contain the definitions of each test to be performed. Additionally, the criteria for acceptance may be included in the test definitions. In some embodiments, the test sequence 402 may include the definitions of all the test workers used to perform a test and the pass/fail criteria for each worker.

The standardized test sequence 402 may be used to compare one hardware design against another. For example, the same test sequence 402 may be used for a new version of a previous design. The difference between the test results can be used to show if the performance has increased or decreased.

The standardized test sequence 402 may be used to verify compliance with an interface standard. For example, the test sequence 402 may include several worker definitions and criteria for pass/fail according to a standard metric. By operating the standard test sequence 402 on each design, each design can be certified compliant with the standard.

One benefit of a standardized test sequence 402 is that a user of the test software only has to learn the software once, regardless of the processor used in the circuit. The designer's familiarity with the software and reuse of the software will justify spending extra time to learn the software more thoroughly and take more advantage of the functions within the software. This aspect can make the designer much more efficient in developing and deploying new designs.

Figure 5:
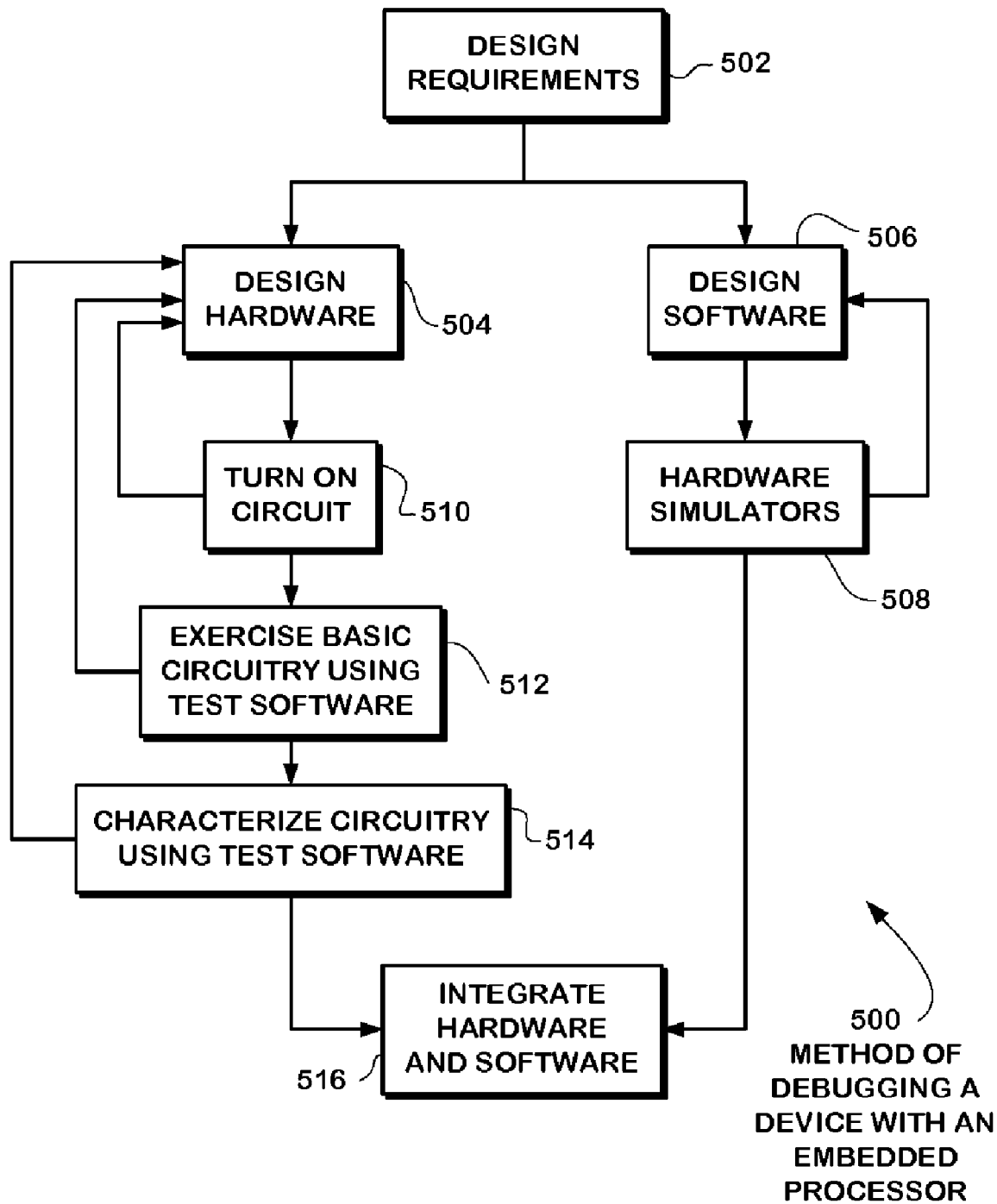
FIG. 5 is a diagrammatic illustration of an embodiment of the present invention showing a method of debugging a device with an embedded processor.

FIG. 5 illustrates an embodiment 500 of the present invention showing a method of debugging a device with an embedded processor that has application software. The design requirements are developed in block 502, and the hardware is designed in block 504 and software is designed in block 506 and simulated in block 508. The hardware is turned on in block 510, the basic circuitry is exercised and tested in block 512 and characterized in block 514. After characterization of the hardware in block 514, the application software and the hardware are integrated and further debugged. After each step in the design process, whether hardware or software, changes may be made to the respective design.

The test software may be used to perform basic exercising of the circuitry in block 512. For example, the test software may be configured to send repeated messages to an interface. The circuitry may be monitored using various measurement tools such as an oscilloscope or logic analyzer to determine if the signals are properly connected, properly conditioned, and have the appropriate characteristics.

The test software may be used to perform characterization and compliance testing in block 514. Once the circuitry is operational, the circuit may be stressed to see where additional problems occur under stressful dynamic conditions. In some instances, the testing may occur in an environmental chamber for temperature changes, radiation survivability, or other test conditions.

In block 514, the circuitry may be characterized in terms of performance metrics required by the design requirements 502. For example, if the design requirements 502 include a minimum data throughput, the circuitry may be characterized in block 514 as being capable of the minimum data throughput. This is particularly useful knowledge when the application software is operable on the device in block 516 and problems are discovered.

A system of test software may be operable on a device with an embedded controller and useful for preliminary testing, characterization, and compliance testing of the circuitry of the device. Various embodiments have been shown to demonstrate different aspects and utility of the system and method, including embodiments that are designed to stress the circuitry as much as possible by running low level software on the embedded processor itself.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A software diagnostics platform on a device with an embedded processor comprising:

a command interface configured for receiving test commands from a test host that communicates with the device and outputting test results to the test host;

an I/O engine configured for running a test sequence for testing the device based on the test commands wherein the engine creates messages that are communicated through a path to a device interface for the device;

an output driver configured for timestamping an outgoing message of the messages wherein the I/O engine sends the outgoing message over the path to the device interface through the output driver and storing said outgoing message;

an input driver configured for timestamping an incoming message of the messages wherein the I/O engine receives the incoming message over the path from the device interface through the input driver and storing said incoming message; and an analysis routine configured for analyzing said outgoing message and said incoming message to determine at least one performance parameter of the path;

wherein said software diagnostics platform being operable on the embedded processor operates on a single board, and tests hardware of said single board; wherein said test sequence comprises multiple threads of the test commands being configured to operate on a single port of the device in parallel.

2. The software diagnostics platform of claim 1 wherein said command interface is operable to communicate via a terminal interface.

3. The software diagnostics platform of claim 1 further comprising: a host program operable on the test host, said host program having a graphical user interface.

4. The software diagnostics platform of claim 1 wherein said test sequence comprises a single test routine.

5. The software diagnostics platform of claim 1 wherein said test sequence comprises a test routine that is repeated for a predetermined period of time.

6. The software diagnostics platform of claim 1 wherein said performance parameter comprises determining one of a group composed of: message transfer time, average message transfer time, and average data throughput per unit time.

7. The software diagnostics platform of claim 1 further comprising an initiator adapted to determine if an I/O device is present.

8. The software diagnostics platform of claim 7 wherein said initiator is further adapted to perform a diagnostic routine with said I/O device.

9. A system comprising:

a device with an embedded processor, said device having a specific function;

a first software system running on said embedded processor and enabling said device to perform said specific function; and a second software system running on said embedded processor, said second software system not able to perform said specific function, said second software system comprising:

a command interface configured for receiving test commands from a test host that communicates with the device and outputting test results to the test host;

an I/O engine configured for running a test sequence for testing the device based on the test commands wherein the engine creates messages that are communicated through a path to a device interface for the device, said test sequence comprising at least two threads of the test commands capable of operating on a single port in parallel;

an output driver configured for timestamping an outgoing message of the messages wherein the I/O engine sends the outgoing message over the path to the device interface through the output driver and storing said outgoing message, said output driver being configured to send said outgoing message to each of output ports;

an input driver configured for timestamping an incoming message of the messages wherein the I/O engine receives the incoming message over the path from the device interface through the input driver and storing said incoming message; and an analysis routine configured for analyzing said outgoing message and said incoming message to determine at least one performance parameter of the path.

10. The system of claim 9 wherein said command interface is operable to communicate via a terminal interface.

11. The system of claim 9 further comprising:

a host program operable on a host system, said host program having a graphical user interface.

12. The system of claim 9 wherein said test sequence comprises a single test routine.

13. The system of claim 9 wherein said test sequence comprises a test routine that is repeated for a predetermined period of time.

14. The system of claim 9 wherein input driver is further adapted to validate said incoming message.

15. The system of claim 9 wherein said analysis comprises determining one of a group composed of: message transfer time, average message transfer time, and average data throughput per unit time.

16. The system of claim 9 further comprising an initiator adapted to determine if an I/O device is present.

17. The system of claim 16 wherein said initiator is further adapted to perform a diagnostic routine with said I/O device.

18. A test system comprising:

a reusable test sequence;

a first command interpreter configured to interpret said reusable test sequence, said first command interpreter being configured to operate on a first embedded processor, said first embedded processor being in a first circuit having a first functionality; and a second command interpreter configured to interpret said reusable test sequence, said second command interpreter being configured to operate on a second embedded processor, said second embedded processor being in a second circuit having a second functionality, said second functionality being different from said first functionality;

wherein said first command interpreter and said second command interpreter each comprise:

a command interface configured for receiving test commands from a test host that communicates with the first and second circuits and outputting test results to the test host;

an I/O engine configured for running a test sequence for testing the first and second circuits based on the test commands wherein the engine creates messages that are communicated through a path to a device interface for the first and second circuits, said test sequence comprising at least two threads of the test commands configured to operate in parallel on a single port;

an output driver configured for timestamping an outgoing message of the messages wherein the I/O engine sends the outgoing message over the path to the device interface through the output driver and storing said outgoing message;

an input driver configured for timestamping an incoming message of the messages wherein the I/O engine receives the incoming message over the path from the device interface through the input driver and storing said incoming message; and an analysis routine configured for analyzing said outgoing message and said incoming message to determine at least one performance parameter of the path.

19. A method of developing a circuit having an embedded processor comprising:

designing a circuit having said embedded processor, said circuit having a predefined function;

assembling said circuit;

designing software operable on said embedded processor, said software configured to enable said circuit to perform said predefined function;

loading said embedded processor with a test platform software comprising:

a command interface adapted to receiving commands and outputting results; a command interface configured for receiving test commands from a test host that communicates with the circuit and outputting test results to the test host;

an I/O engine configured for running a test sequence for testing the circuit based on the test commands wherein the engine creates messages that are communicated through a path to a device interface for the circuit, said test sequence comprising at least two threads of the test commands configured to operate in parallel on a single port;

an output driver configured for timestamping an outgoing message of the messages wherein the I/O engine sends the outgoing message over the path to the device interface through the output driver and storing said outgoing message;

an input driver configured for timestamping an incoming message of the messages wherein the I/O engine receives the incoming message over the path from the device interface through the input driver and storing said incoming message; and an analysis routine configured for analyzing said outgoing message and said incoming message to determine at least one performance parameter of the path and creating results of the analysis; and a display routine for displaying said created results;

creating said test sequence;

transmitting said test sequence to said embedded processor loaded with said test platform software;

operating said test sequence on said embedded processor; and analyzing said created results.

\* \* \* \* \*